J. W. SUTTON.
Pulley-Cover.
No. 166,233.　　　　　　　　　　　　　Patented Aug. 3, 1875.
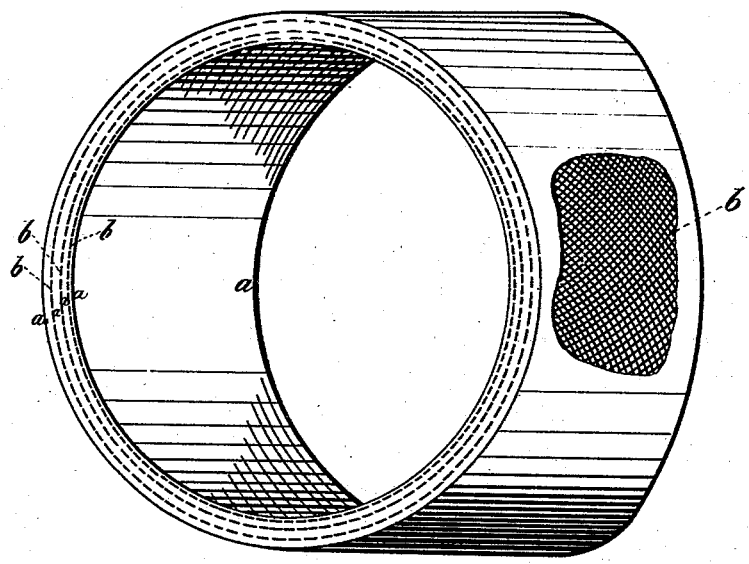
Witnesses.
WM Edwards
Chas. B. Atkinson
Inventor.
John W Sutton
per
James A Whitney
atty

UNITED STATES PATENT OFFICE.

JOHN W. SUTTON, OF NEW YORK, N. Y.

IMPROVEMENT IN PULLEY-COVERS.

Specification forming part of Letters Patent No. 166,233, dated August 3, 1875; application filed May 21, 1875.

*To all whom it may concern:*

Be it known that I, JOHN W. SUTTON, of the city, county, and State of New York, have invented an Improvement in Pulley-Covers, of which the following is a specification:

This invention comprises an improvement in the rubber cover for flat pulleys secured to me by Letters Patent No. 125,228, dated April 2, 1872, the object of this my present invention being to render the aforesaid pulley-cover stronger, more durable, and less liable to displacement when in use, without in any material degree detracting from the elasticity required in the cover in order to fit it to its place, or with the character of the rubber surfaces which insures alike the snug clasp of the cover upon the pulley, and its frictional or driving action upon the belt or band operated thereby.

My present improvement consists of a pulley-cover constructed with embedded layers of bias woven fabric, whereby the desired object is effectually secured.

The drawing is a perspective view of a pulley-cover made according to my invention, a portion of the external surface being represented as broken away to show the internal structure of the cover.

In the manufacture of my improved pulley-cover, I provide alternate layers of india-rubber and canvas. The canvas is cut bias so that when the fabric is subjected to longitudinal strain, it will yield or stretch, and the rubber is mingled with sulphur in one proportion, and otherwise properly prepared for vulcanization. A layer, of the prepared rubber, of a width and length proportioned to the desired size of the cover, is brought to circular and endless form, and upon the outer surface of this is applied a layer or thickness, $b$, of what is technically termed friction-cloth, the same being canvas-coated on each side with adhesive india-rubber, care being taken that the cloth be so cut that the canvas shall be bias, or with the fibers running diagonal with the edges. Upon this is placed another layer of the prepared rubber, and, if desired, another of the friction-cloth itself covered by an additional layer of the prepared rubber.

Any desired number of the alternate layers of the prepared rubber and the friction-cloth may of course be used, care being taken to have a layer of the rubber upon the outer as well as upon the inner surface. The whole is subjected to vulcanization, which unites the rubber to the cloth, and provides a firm, strong pulley-cover, capable of withstanding the wear and tear, which, as shown by experience, is rapid and injurious to the pulley-covers made wholly of rubber, and which, from the bias of the canvas, permits a slight elasticity to the cover, whereby it may be stretched for slipping tightly upon the pulley. When desired, a lining of raw or unvulcanizable rubber may be cemented to the inner surface of the pulley to give a more persistent gripe, in proportion to the tightness of the cover, to the said cover when placed upon the pulley for use.

I am aware that canvas cut bias has been placed between layers of rubber in the manufacture of various articles, such for example, as engine-hose and a certain alleged improvement in belts for machinery, but the function, use, and arrangement of the bias fabric in both of these, and of all other cases of which I am aware, are wholly different from those of said bias material in my invention. Therefore I do not claim, broadly, the combination of alternating layers of rubber and bias fabric; but What I do claim as my invention, the same being an improvement upon my heretofore-named Letters Patent No. 125,228, is—

The endless pulley-cover composed of one or more layers of bias canvas inclosed between concentric layers of rubber, the whole being united by vulcanization, substantially as and for the purpose set forth.

JOHN W. SUTTON.

Attest:
W. M. EDWARDS,
CHAS. B. ATKINSON.